United States Patent
Chen et al.

(10) Patent No.: US 6,299,806 B1
(45) Date of Patent: Oct. 9, 2001

(54) METHOD FOR MANUFACTURING EVA OUTSOLES

(75) Inventors: Ching-Chin Chen, Rm B, Fl. 16, No. 60-2 Gungye 1st Rd., Taichung; Shih-Kan Liang, No. 4, Alley 4, Lane 62, Jifeng W. Rd., Wufeng Shiang, Taichung, both of (TW)

(73) Assignees: Ching-Chin Chen; Shih-Kan Liang; Chun Heir Industry Co., Ltd., all of Taichung (TW)

( * ) Notice: Subject to any disclaimer, the term of this patent is extended or adjusted under 35 U.S.C. 154(b) by 0 days.

(21) Appl. No.: 09/524,603

(22) Filed: Mar. 14, 2000

(51) Int. Cl.$^7$ .................................... B29C 44/06
(52) U.S. Cl. ..................... 264/45.1; 264/51; 264/152; 264/161; 264/320
(58) Field of Search ................... 156/79; 264/152, 264/51, 54, 45.1, 320, 161

(56) References Cited

U.S. PATENT DOCUMENTS

| | | | |
|---|---|---|---|
| 5,141,578 | * 8/1992 | Yang | 264/45.1 |
| 5,308,420 | * 5/1994 | Yang | 264/45.1 |
| 5,318,645 | * 6/1994 | Yang | 264/45.1 |
| 5,350,544 | * 9/1994 | Bambara et al. | 264/321 |
| 5,503,786 | * 4/1996 | Yang | 156/79 |
| 5,547,620 | * 8/1996 | Guiotto | 264/46.4 |
| 5,560,877 | * 10/1996 | Yung et al. | 264/321 |
| 5,814,254 | * 9/1998 | Bisconti | 264/46.4 |
| 5,837,174 | * 11/1998 | Bisconti | 264/321 |
| 5,843,352 | * 12/1998 | Chi | 264/45.1 |
| 5,868,981 | * 2/1999 | Bisconti | 264/321 |
| 5,972,257 | * 10/1999 | Liu | 264/46.4 |
| 6,045,733 | * 4/2000 | Chu et al. | 264/46.4 |

\* cited by examiner

Primary Examiner—Allan R. Kuhns
(74) Attorney, Agent, or Firm—Rosenberg, Klein & Lee

(57) ABSTRACT

A method for manufacturing EVA outsoles includes step 1 to mix EVA and foaming agent to become a mixture; step 2 to press the mixture to be a plate; step 3 to cut the plate into strips; step 4 to overlap the strips to a desired weight; step 5 to heat the overlapped strips in step 4 in a mold to form an outsole, and step 6 to trim the outsoles.

1 Claim, 2 Drawing Sheets

METHOD FOR MANUFACTURING EVA OUTSOLES

FIELD OF THE INVENTION

The present invention relates to a method for manufacturing EVA outsoles and the method involves fewer steps and saves more EVA material.

BACKGROUND OF THE INVENTION

A method known to applicant about the steps for manufacturing EVA outsoles is shown in FIG. 1 and includes the following steps:

step 1: mixing EVA, related components and foaming Agent;

step 2: pressing the mixture as mentioned in step 1 to be a plate;

step 3: cutting the plate into strips;

step 4: using a foaming machine to foam the strips;

step 5: peeling a top surface and a bottom surface of each strip;

step 6: shaping the foamed strips to be a desired shape;

step 7: trimming each strip in step 6, and step 8: heating the skips in step 7 in a mold to forming the strips into ousoles.

This method involves too many steps and only a certain amount of EVA can be utilized because too much EVA material is discarded when peeling the top surface and the bottom surface of the strips.

The present invention intends to provide a method for manufacturing EVA outsole and the steps of the method are fewer than the conventional method and the EVA material can be saved about 30% to 40% of the quantity of EVA material that is used in conventional method.

SUMMARY OF THE INVENTION

In accordance with one aspect of the present invention, there is provided a method for manufacturing EVA outsoles, comprising the following steps:

step 1: mixing EVA and foaming agent to become a mixture;

step 2: pressing the mixture as mentioned in step 1 to be a plate;

step 3: cutting the plate into strips;

step 4: overlapping the strips to a desired weight;

step 5: heating the overlapped strips in step 4 in a mold to forming an outsole, and step 6: trimming the outsoles.

The EVA material is not discarded during the steps of the method of the present invention so that the EVA material is used effectively.

The patterns of the outsole can be directly formed in the outsoles by the mold so that it takes less time to manufacture the outsoles.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
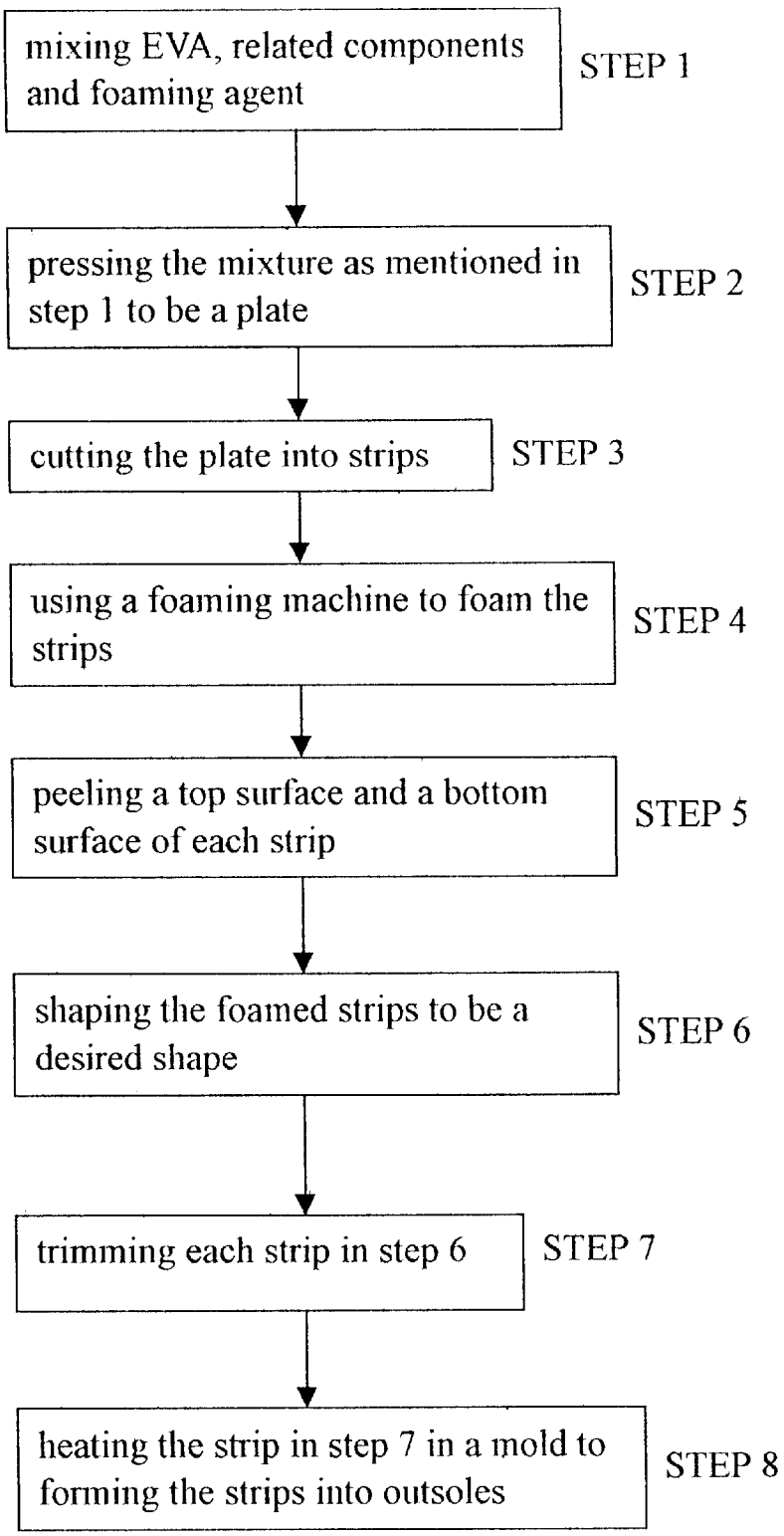
FIG. 1 is a flow chart to show a conventional method for manufacturing EVA outsoles.
Figure 2:
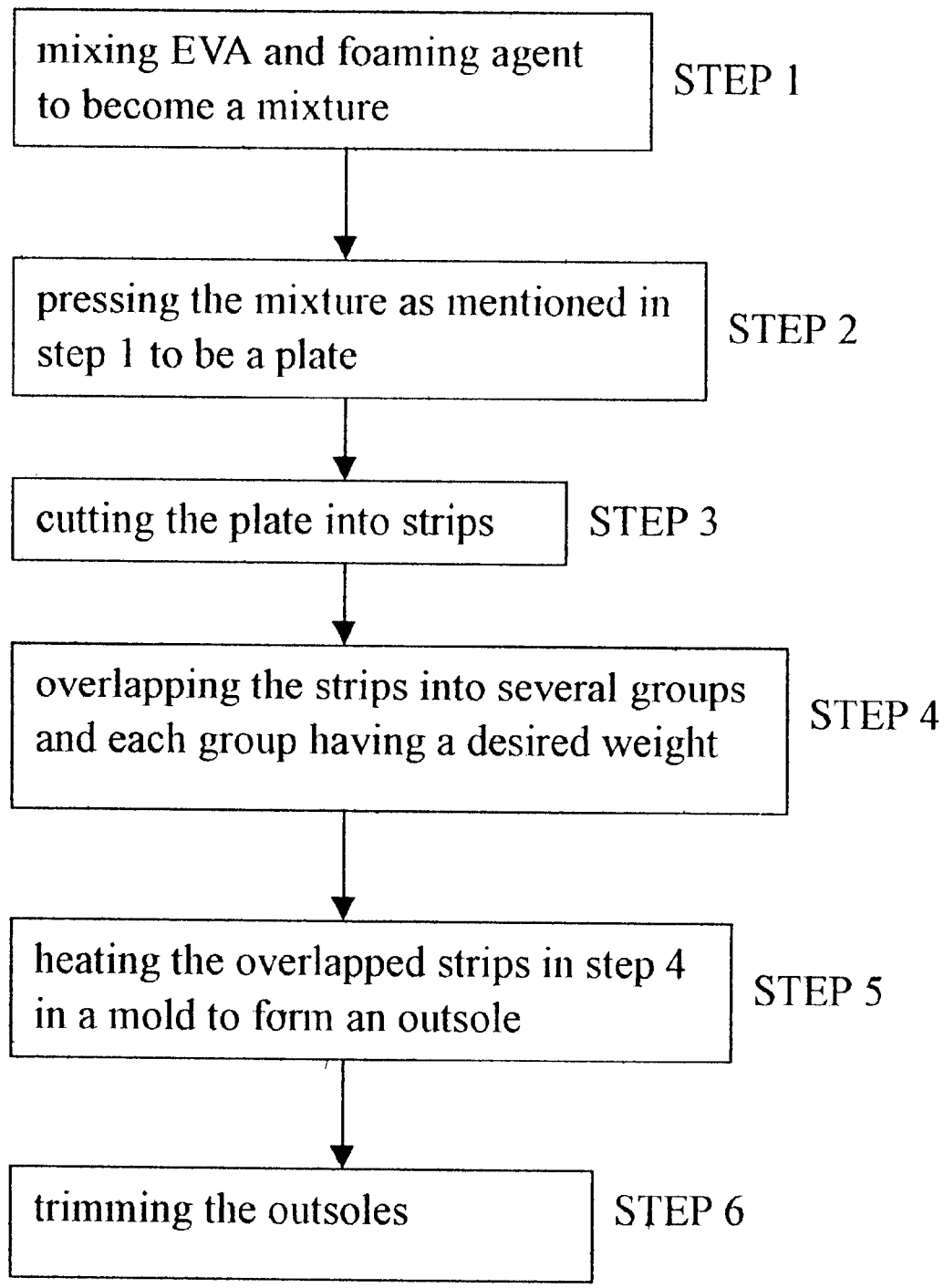
FIG. 2 is a flow chart to show a method for manufacturing EVA outsoles in accordance with the present invention.

Referring to FIG. 2, the method in accordance with the present invention comprises the following steps which are:

step 1: mixing EVA and foaming agent to become a mixture;

step 2: pressing the mixture as mentioned in step 1 to be a plate;

step 3: cutting the plate into strips;

step 4: overlapping the strips into several groups and each group having a desired weight;

step 5: heating the overlapped strips in step 4 in a mold to form an outsole, herein the mold has pattern defined in an inside thereof, and step 6: trimming the outsoles.

In the method, there is no peeling process so that the EVA material that can be saved is about 30% to 40% of the quantity of EVA material that is used in the conventional method. The mold has patterns defined in an inside thereof so that the outsoles made by the method of the present invention are final products. The size of the mold mentioned in step 5 is ½ to ⅔ of the full size of a conventional mold.

While we have shown and described various embodiments in accordance with the present invention, it should be clear to those skilled in the art that further embodiments may be made without departing from the scope and spirit of the present invention.

What is claimed is:

1. A method of fabricating an EVA outer sole comprising the steps of:

(a) mixing an EVA composition with a foaming agent to form a mixture;

(b) pressing said mixture to form a mixture plate;

(c) cutting said mixture plate to form a plurality of mixture strips;

(d) overlapping a plurality of said mixture strips one over the other to form an overlapped set of said mixture strips having a desired weight.

(e) heating said overlapped set in a single mold which has a pattern defined internally thereon so as to form a concurrently cured and shaped outer sole having said pattern; and, (f) removing said outer sole from said mold and trimming said outer sole.

* * * * *